United States Patent [19]

Tomlinson et al.

[11] 4,279,180

[45] Jul. 21, 1981

[54] MULTI-SPINDLE LATHES

[75] Inventors: Geoffrey E. S. Tomlinson, Solihull; Roy S. Dolman, Polesworth, Nr. Tamworth, both of England

[73] Assignee: White-BSA Tools Ltd., Birmingham, England

[21] Appl. No.: 41,518

[22] Filed: May 22, 1979

[30] Foreign Application Priority Data

May 24, 1978 [GB] United Kingdom ............... 22135/78

[51] Int. Cl.³ .......................... B23B 3/00; B23B 3/34; B23B 19/02
[52] U.S. Cl. .......................................... 82/1 C; 82/3; 82/28 R
[58] Field of Search ...................... 82/3, 24, 25, 28 R, 82/28 A, 28 B, 29 R, 29 A, 1 C

[56] References Cited

U.S. PATENT DOCUMENTS 3,453,913 7/1969 Sylla ............................................ 82/3
3,747,444 7/1973 Schubert ............................... 82/28 R

FOREIGN PATENT DOCUMENTS 1230647 12/1966 Fed. Rep. of Germany ............... 82/3
1477880 9/1969 Fed. Rep. of Germany ............... 82/3
2333635 2/1974 Fed. Rep. of Germany ............... 82/3

Primary Examiner—Harrison L. Hinson

[57] ABSTRACT

A multi-spindle machine tool has a frame, a work spindle carrier and its rotatable work spindles indexably mounted on the frame, and a main drive shaft provided with a main brake and a main clutch. A plurality of clutches and selectively actuable to place the work spindles respectively into and out of driving engagement with the main drive shaft, and a plurality of selectively actuable brake devices are provided for the respective spindles. The arrangement is such that one or more of the work spindles can be arrested at a stage in a machining cycle by first disengaging the main clutch and applying the main brake so as to arrest all of the work spindles, and then actuating the appropriate ones of the clutches and brake devices so as to hold the appropriate work spindle or work spindles while the remaining work spindles are re-started.

10 Claims, 1 Drawing Figure

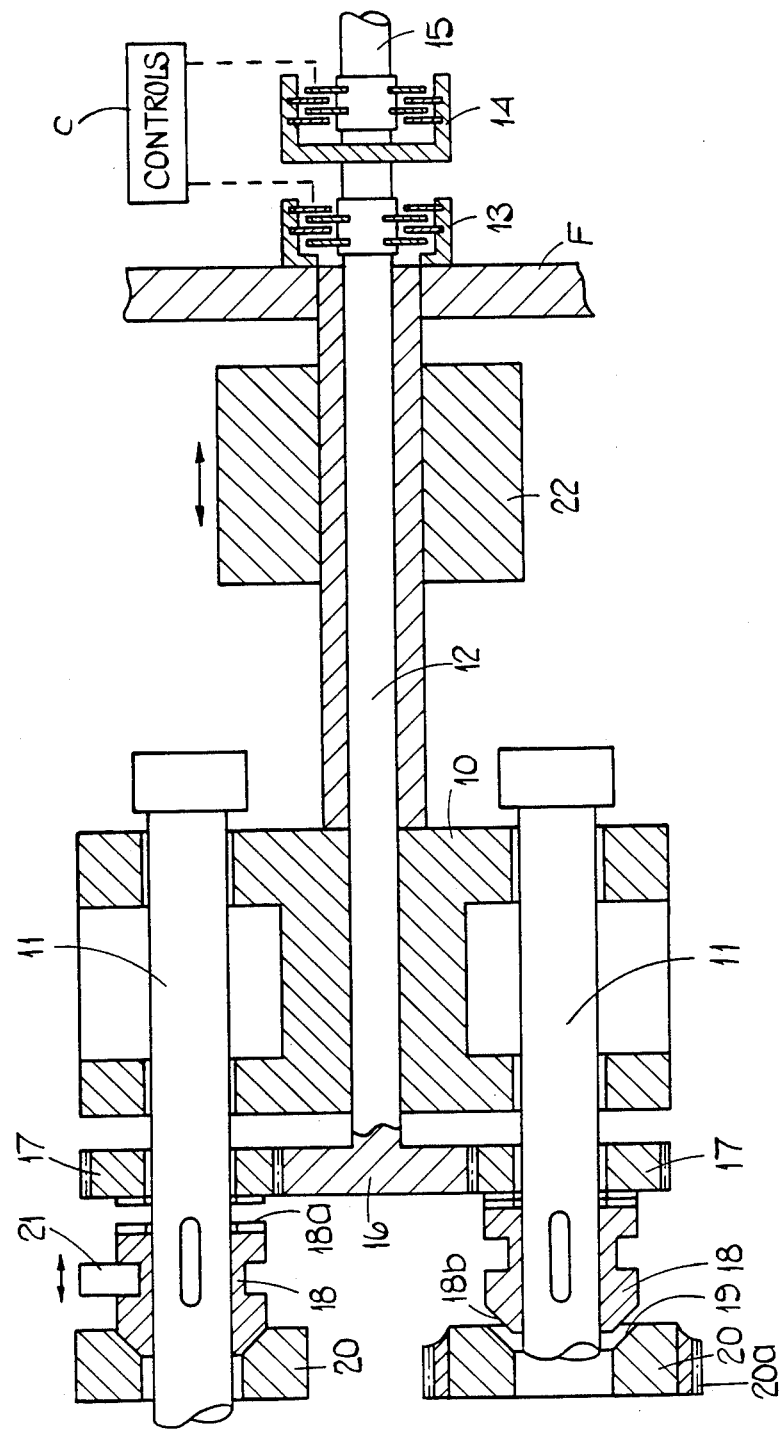

MULTI-SPINDLE LATHES

This invention relates to a multi-spindle machine tool and has as an object to provide such a machine tool in a convenient form.

A multi-spindle machine tool in accordance with the invention comprises a frame, a work spindle carrier indexably mounted on the frame, a plurality of work spindles rotatably carried by the carrier, a main drive shaft provided with a main brake and a main clutch, a plurality of clutch means which are selectively actuable to place the work spindles respectively into and out of driving engagement with the main drive shaft, and a plurality of selectively actuable brake devices for the spindles respectively, the arrangement being such that one or more of the work spindles can be arrested at a stage in a machining cycle by first disengaging the main clutch and applying the main brake so as to arrest all of the work spindles, and then actuating the appropriate ones of the clutch means and brake devices so as to hold the appropriate work spindle or work spindles while the remaining work spindles are re-started.

An example of the invention is shown diagrammatically in section in the accompanying drawing.

The multi-spindle machine tool includes a frame F (only a part of which appears in the drawing), on which there is indexably mounted a work spindle carrier 10, a mechanism being provided for indexing, locating and clamping the carrier. This mechanism is not shown in the drawing and is not further described since it forms no part of the present invention. A plurality of work spindles 11 are arranged in equi-spaced parallel relationship about the axis of the carrier 10 and are rotatably carried thereby. A main drive shaft 12 is rotatably mounted on the frame F and extends along the axis of the carrier 10. A main brake 13 and a main clutch 14, both of multi-plate friction type, are provided on the shaft 12, the clutch 14 serving to connect the shaft 12 to a spindle drive input 15.

The shaft 12 carries for rotation therewith a gear 16, and gears 17 which are freely mounted on the spindles 11 respectively are meshed therewith. A dog clutch member 18 is provided on each spindle for drivingly connecting it to the associated gear 17. Each dog clutch member 18 is keyed to the associated spindle 11 and also acts as a brake member. To this end each member 18 has dogs 18a at one end, and a frusto-conical brake surface 18b at the other. The brake surface 18b co-acts with a corresponding surface 19 on a respective ring 20 carried by the carrier.

When the machining cycle to be carried out calls for off axis bores in the workpieces or other operations which involve arresting the spindles at one work station, controls C of the machine are set up to disengage the clutch 14 and engage the brake 13 at the end of each cycle. This can take place during the time when the tool side 22 is on its return stroke etc., and no increase in the cycle times results. All of the spindles are thus arrested, and the dog member 18 associated with the spindle which is to remain stationary is axially displaced by an operating element 21 provided at the appropriate work station (see the upper part of the drawing,) or alternatively by the indexing motion of the carrier. In either case, the dog clutch is disengaged and the brake 18b, 19 is applied to hold the appropriate spindle against rotation when the main drive is re-started. Before the carrier is indexed again, the main shaft 12 is stopped, and the dog clutch is re-engaged preferably by the indexing motion of the carrier.

Each ring 20 can, as illustrated in the upper part of the drawing, be fixed relative to the carrier 10. Alternatively, the rings 20 can each be rotatable relative to the carrier and, as shown in the lower part of the drawing, can be provided with gearing 20a thereon which meshes with a common ring gear (not shown). In this way, after the main drive has been stopped and the dog member 18 of the appropriate spindle 11 has been engaged with the respective ring 20, the ring gear can be turned to rotate the ring 20 and hence the spindle 11 slowly in either the forward or the reverse direction until the spindle reaches a predetermined location, where it is then held.

It will be appreciated that there is no requirement for the brake 18b, 19 and the dog clutch to absorb energy driving, stopping and starting the associated spindle. Thus, the brake and the dog clutch can be of extremely compact configuration, which is important since space is at a premium in the immediate vicinity of the spindle carrier. All energy absorption during stopping and starting is carried out by the main brake 13 and main clutch 14, which can be situated at a position where more space is readily available.

We claim:

1. A multi-spindle machine tool comprising a frame, a spindle carrier mounted on said frame for indexing movement relative thereto, a plurality of work spindles rotatably carried by said spindle carrier, a main drive shaft from which said work spindles are driven, a main clutch and a main brake provided for said main drive shaft, a brake device provided for each said work spindle, a dog clutch for each said work spindle which can be actuated to place said work spindle into and out of driving engagement with said main drive shaft, and a control operative during a machining cycle of said machine tool to disengage said main clutch and apply said main brake thereby to arrest rotation of all said work spindles, subsequently to disengage said dog clutch and apply said brake device for each of at least one of said work spindles, and finally to release said main brake and engage said main clutch thereby to re-start rotation of the remainder of said work spindles.

2. The multi-spindle machine tool according to claim 1, further comprising a first gear fixed to said main drive shaft for rotation therewith, and a respective second gear freely rotatably mounted on each said work spindle and in meshing engagement with said first gear, wherein each said dog clutch includes a member which is rotatable with the respective work spindle and which is slidable therealong into and out of rotation transmitting engagement with the respective second gear.

3. The multi-spindle machine tool according to claim 1, wherein each said brake device comprises a relatively fixed first member and a second member which is rotatable with the respective work spindle and which is slidable therealong into and out of frictional engagement with said first member.

4. The multi-spindle machine tool according to claim 3, wherein said first member of each said brake device is fixed relative to said spindle carrier.

5. The multi-spindle machine tool according to claim 3, wherein said first member of each said brake device is rotatable relative to said spindle carrier, and the respective work spindle can be rotated by said spindle carrier into a predetermined location when said second member of said brake device is frictionally engaged with said first member.

6. The multi-spindle machine tool according to claim 3, wherein said first and second members of each said brake device have respective frusto-conical surfaces which can be mutually frictionally engaged.

7. The multi-spindle machine tool according to claim 1, further comprising a first gear fixed to said main drive shaft for rotation therewith, a respective second gear freely rotatably mounted on each said work spindle and in meshing engagement with said first gear, a relatively fixed first member provided for each said work spindle, and a second member which is rotatable with each said work spindle and which is slidable therealong, said second member having a first part which can be placed into and out of rotation-transmitting engagement with the respective second gear and a second part which can be placed into and out of frictional engagement with the respective first member, each said dog clutch being formed by said first part of the respective second member and the respective second gear, and each said brake device being formed by the second part of the respective second member and the respective first member.

8. The multi-spindle machine tool according to claim 1, wherein actuation of said dog clutch and of said brake device for each of said at least one of said work spindles is performed by indexing motion of said spindle carrier.

9. A method of arresting at least one rotatable work spindle during a machining cycle of a multi-spindle machine tool having a main drive shaft provided with a main brake and a main clutch, and a plurality of rotatable work spindles each of which is provided with a respective brake device and a respective dog clutch, each said work spindle being capable of being placed into and out of driving engagement with said main drive shaft by actuation of said respective dog clutch, said method comprising the steps of:

arresting all of said work spindles by disengaging said main clutch and applying said main brake; disengaging said respective dog clutch of each work spindle which is to be arrested and applying said respective brake device to hold that work spindle against rotation; and re-starting rotation of the remaining work spindles by releasing said main brake and engaging said main clutch.

10. A multi-spindle machine tool comprising a frame, a spindle carrier mounted on said frame for indexing movement relative thereto, a plurality of work spindles rotatably carried by said spindle carrier, a main drive shaft from which said work spindles are driven, a main clutch and a main brake provided for said main drive shaft, a brake device provided for each said work spindle, a dog clutch for each said work spindle which can be actuated to place said work spindle into and out of driving engagement with said main drive shaft, and a control operative during a machining cycle of said machine tool to disengage said main clutch and apply said main brake thereby to arrest rotation of all said work spindles, subsequently to disengage said dog clutch and apply said brake device for each of at least one of said work spindles, and finally to release said main brake and engage said main clutch thereby to re-start rotation of the remainder of said work spindles, further comprising a first gear fixed to said main drive shaft for rotation therewith, and a respective second gear freely rotatably mounted on each said work spindle and in meshing engagement with said first gear, wherein each said dog clutch includes a member which is rotatable with the respective work spindle and which is slidable therealong into and out of rotation transmitting engagement with the respective second gear.

* * * * *